(12) United States Patent
Nagareo et al.

(10) Patent No.: US 8,227,081 B2
(45) Date of Patent: Jul. 24, 2012

(54) TRANSFER-TYPE PRESSURE SENSITIVE ADHESIVE TAPE

(75) Inventors: Hideki Nagareo, Osaka (JP); Kazuo Miyai, Osaka (JP)

(73) Assignee: Fujicopian Co., Ltd., Osaka (JP)

( * ) Notice: Subject to any disclaimer, the term of this patent is extended or adjusted under 35 U.S.C. 154(b) by 518 days.

(21) Appl. No.: 11/815,778

(22) PCT Filed: Feb. 3, 2006

(86) PCT No.: PCT/JP2006/301844
§ 371 (c)(1),
(2), (4) Date: Aug. 8, 2007

(87) PCT Pub. No.: WO2006/085483
PCT Pub. Date: Aug. 17, 2006

(65) Prior Publication Data
US 2009/0075005 A1    Mar. 19, 2009

(30) Foreign Application Priority Data

Feb. 10, 2005    (JP) ................. 2005-035159

(51) Int. Cl.
*B32B 7/12* (2006.01)
(52) U.S. Cl. .............. 428/343; 428/355; 428/354
(58) Field of Classification Search ............ 428/343
See application file for complete search history.

(56) References Cited

U.S. PATENT DOCUMENTS

| | | | |
|---|---|---|---|
| 6,235,364 B1 * | 5/2001 | Katsuro et al. | 428/40.1 |
| 6,379,791 B1 * | 4/2002 | Cernohous et al. | 428/355 R |
| 6,479,073 B1 * | 11/2002 | Lucast et al. | 424/448 |
| 6,500,509 B1 * | 12/2002 | Katsuro et al. | 428/40.1 |
| 6,770,700 B2 * | 8/2004 | Mueller et al. | 524/494 |
| 2003/0114591 A1 * | 6/2003 | Sato et al. | 525/178 |
| 2003/0205332 A1 | 11/2003 | Shinya | |
| 2004/0180196 A1 * | 9/2004 | Yamashita | 428/343 |
| 2005/0049133 A1 * | 3/2005 | Fujiwara et al. | 501/70 |

FOREIGN PATENT DOCUMENTS

| | | | |
|---|---|---|---|
| JP | 07025635 | * | 1/1995 |
| JP | 8-269109 | | 10/1996 |
| JP | 11-302613 | | 11/1999 |
| JP | 2002-226824 | | 8/2002 |
| JP | 2003-27033 | | 1/2003 |
| JP | 2003-113353 | | 4/2003 |
| KR | 2003-0086196 | | 11/2003 |

OTHER PUBLICATIONS

Machine translation JP07-025635 (1995).*
http://science.howstuffworks.com/mica-info.htm (retrieved on Jan. 15, 2010).*
International Search Report mailed Apr. 11, 206 in International Application No. PCT/JP2006/301844.
International Preliminary Report on Patentability; International application No. PCT/JP2006/301844; International filing date: Feb. 3, 2006, Report issued Aug. 14, 2007.
Written Opinion of the International Searching Authority; International Application No. PCT/JP2006/301844; International filing date: Feb. 3, 2006.
Korean Office Action dated Sep. 29, 2011.

* cited by examiner

*Primary Examiner* — Callie Shosho
*Assistant Examiner* — Samir Shah
(74) *Attorney, Agent, or Firm* — Antonelli, Terry, Stout & Kraus, LLP.

(57) ABSTRACT

A transfer-type pressure sensitive adhesive tape containing a pressure sensitive adhesive layer on a support, which is characterized in that ramentum particles are incorporated in the pressure sensitive adhesive layer for the purpose of providing a transfer-type pressure sensitive adhesive tape wherein the pressure sensitive adhesive layer can surely be cut off at the desired position upon transfer thereof under sufficiently keeping adhesive force to a receiving object such as a paper surface and running ability without using any specific pressure sensitive adhesive agent by selecting particles to be added to the pressure sensitive adhesive layer.

1 Claim, No Drawings

TRANSFER-TYPE PRESSURE SENSITIVE ADHESIVE TAPE

RELATED APPLICATION

This is a U.S. national phase application under 35 U.S.C. §371 of International Application No. PCT/JP2006/301844 filed Feb. 3, 2006, which claims priority under 35 U.S.C. §1119 of Japanese Patent Application No. 2005-035159 filed Feb. 10, 2005.

TECHNICAL FIELD

The present invention relates to a transfer-type pressure sensitive adhesive tape having a releasable pressure sensitive adhesive layer on a support.

BACKGROUND ART

A transfer-type pressure sensitive adhesive tape having a releasable pressure sensitive adhesive layer on a support has been used for the purpose that the pressure sensitive adhesive layer is released from the support, transferred to a receiving object such as a paper surface and the receiving object is adhered to an other article.

The transfer-type pressure sensitive adhesive tape to be used is generally contained in a handy-type film transfer tool. There is available, as this kind of film transfer tool, one having such a construction as comprising a supply reel on which a transfer-type pressure sensitive adhesive tape is wound, a winding reel for winding a support body after transferring the pressure sensitive adhesive layer, a head for transferring the pressure sensitive adhesive layer to a receiving object under pressure, which is located in an intermittent position of a tape transporting route between the supply reel and the winding reel, and a casing for containing them, the head having exposure out of the casing.

In a case where the transfer-type adhesive tape is transferred from a film transfer tool to a receiving object such as a paper surface, when film-cutting-off property of the pressure sensitive adhesive layer is poor, there is observed a stringy phenomenon between the transferred pressure sensitive adhesive layer transformed on the paper surface and the pressure sensitive adhesive layer on the side of the film transfer tool upon removing the film transfer tool from the paper surface, whereby the transfer working is deteriorated.

Thus, in conventional technologies, in order to improve film-cutting-off property of a transfer-type pressure sensitive adhesive tape, a polymer material for a pressure sensitive adhesive agent (adhesive agent) is selected (in Japanese Patent Publication No. 1994-62920, an acryl resin base adhesive agent is incorporated with alginic acid) or a cross-linking is accelerated. And addition of filler to a pressure sensitive adhesive layer (Japanese Patent No. 3518469) and addition of needle like particles (Japanese Patent Publication No. 2003-113353) have been tried.

However, in these methods, use of a special adhesive agent is necessary, and even when a filler is added, cutting-off property of a pressure sensitive adhesive layer is insufficient in spherical or bulky particles and further lowering of tacking effect and an initial adhesive force is observed when a particle size or an amount to be added is increased. Further, in needle like particles, a comparatively strong strength (hardness) and length are required for breaking the membrane of the pressure sensitive adhesive layer by the needle like particles because the cutting-off effect can be attained only by a sharp top edge part of the needle like particles, though the particles themselves have a cutting-off power. Still further, a relatively long time is required for complete cutting-off the membrane (a slight stringy phenomenon observed) because a cutting-off surface is small due to cutting-off of by a sharp top edge part.

DISCLOSURE OF INVENTION

The object of the present invention is to provide a transfer-type pressure sensitive adhesive tape, wherein the pressure sensitive adhesive layer can surely be cut off at the desired position upon transfer thereof under keeping sufficient adhesive force to a receiving object such as a paper surface and running ability as compared with filler, spherical particles and needle like particles which have so far been studied by selection of particles to be added to a pressure sensitive adhesive layer without using any specific adhesive agent.

The present inventors have made extensive study on a pressure sensitive adhesive layer of a transfer-type pressure sensitive adhesive tape to reach findings that incorporation of a suitable amount of ramentum particles, to a pressure sensitive adhesive layer can contribute breaking of the membrane to cut-off the pressure sensitive adhesive layer by a total flat surface of the ramentum particles upon transfer of the pressure sensitive adhesive layer under keeping sufficient adhesive force to a receiving object such as a paper surface and running ability, whereby the cutting-off surface is large and time required for complete breaking of the membrane is shortened and thus breaking can be attained surely at the desired position, and on the basis of these findings, the present invention has been completed.

Namely, the present invention provides the following pressure sensitive adhesive tape.

(1) A pressure sensitive adhesive tape in a transfer-type pressure sensitive adhesive tape containing a pressure sensitive adhesive layer on a support body, wherein the above pressure sensitive adhesive layer contains ramentum particles.
(2) The pressure sensitive adhesive tape of the above (1) wherein Mohs hardness of the ramentum particles is 4.5 or more.
(3) The pressure sensitive adhesive tape of the above (1) or (2) wherein thickness of the ramentum particle is 1 to 15 μm, an average length and width thereof are each 40 to 400 μm and a ratio of the average width to length is 1:1 to 1:3.
(4) The pressure sensitive adhesive tape of any of the above (1) to (3) wherein the ramentum particles are incorporated in an amount of 0.5 to 5% by weight.

BEST MODE FOR CARRYING OUT INVENTION

In the pressure sensitive adhesive tape of the present invention, an organic polymer film support and a paper support are preferably used. As the organic polymer film support, a polyester film, a polycarbonate film, a polymethyl methacrylate film, a polypropylene film, a polyimide film and other various kinds of film are usable as the support body, and the polyester film is particularly preferable in viewpoints of cost and function. Further, the thickness of the film support is preferably 6 to 50 μm, still preferably 12 to 25 μm from viewpoints of transferability and cost. As the paper support, a high density paper such as glassine paper, and a laminate paper in which a resin film such as polyethylene is laminated on a clay coat paper, craft paper and a high quality paper, etc. can be used, among which a glassine paper is preferable from cost and function point of view. The thickness of the paper support is preferably within a range of 20 to 50 μm.

The support is preferably used as a sheet wherein it is provided with a releasing property on both sides thereof (hereinafter referred to as releasing sheet) by coating a releasing agent such as a silicone compound, a fluorine resin and a fluorosilicone resin on its surface.

The pressure sensitive adhesive composition used in forming a pressure sensitive adhesive layer in a transfer-type pressure sensitive adhesive tape is not specifically restricted and conventional adhesive compositions can be used, among which one comprising an acryl type copolymer and a cross-linking agent as the essential ingredients and if necessary, a tackifier resin is preferably used.

The acryl type copolymer includes copolymers of one or more alkyl esters of (meth)acrylate, the carbon atom number of the alkyl group being 4 to 18 and one or more of other monomer containing polymerizable ethylenically unsaturated bond, etc.

Examples of the (meth)acrylic acid alkyl esters alkyl (meth)acrylate include n-butyl(meth)acrylate, isobutyl (meth)acrylate, hexyl(meth)acrylate, 2-ethylhexyl(meth) acrylate, n-octyl(meth)acrylate, isooctyl(meth)acrylate, isononyl(meth)acrylate, lauryl(meth)acrylate, and stearyl (meth)acrylate.

Examples of the copolymerizable monomer containing an ethylenically unsaturated bond include acrylonitrile, methyl (meth) acrylate, ethyl(meth)acrylate, propyl(meth)acrylate, isopropyl(meth) acrylate, cyclohexyl(meth)acrylate, styrene, α-methyl styrene, vinyl acetate, N-vinyl-2-pyrrolidone, benzyl(meth)acrylate, 2-hydroxyethyl(meth)acrylate, 2-hydroxypropyl(meth)acrylate, acrylic acid, methacrylic acid, itaconic acid, and fumaric acid. In the production of the acryl type copolymer, the after-mentioned monomer having a functional group reactive with a cross-linking agent (e.g. a monomer containing a carboxylic group) is used as the essential ingredient as the copolymerizable monomer containing an ethylenically unsaturated bond.

Examples of the tackifier resin include a rosin type resin such as rosin, a rosin phenol resin, and its esterified product and its metal salt, a terpene type polymer such as a terpene polymer, a terpene-phenol resin and an aromatic modified terpene resin, a styerene type resin, a coumarone/indene resin, an alkylphenol resin, a xylene resin, a C5 type petroleum resin, C9 type petroleum resin, and an alicyclic hydrogenated resin, among which a natural resin type such as a rosin type resin and a terpene type resin are preferably used because they are excellent in compatibility with an acryl type copolymer and show good adhesive force and an initial tackiness to a receiving object such as paper and various films upon incorporating in the acryl type copolymer.

Examples of the cross-linking agent in order to cross-link an acryl type copolymer in the adhesive composition of the present invention include an isocyanate type cross-linking agent including a diisocyanate compound such as hexamethylene diisocyanate, xylylene diisocyanate, tolylene diisocyanate, 2-chloro-1,4-phenyl diisocyanate, trimethylhexamethylene diisocyanate, 1,5-naphthalene diisocyanate and isophorone diisocyanate, a biuret trimer and an isocyanurate type trimer of these diisocyanate compounds, and triisocyanates, epoxy type cross-linking agents, a melamine type cross-linking agent, a metal chelate type cross-linking agents, and adducts of a polyol such as trimethylol propane, and a suitable one can appropriately be selected for use.

In the adhesive composition are incorporated ramentum particles in order to increase film-cutting-off ability upon transferring. Thickness of the ramentum particles is preferably 1 to 15 µm from a viewpoint of tacking ability and adhesive force of the adhesive layer. Further, an average length and width of the ramentum particles are 40 to 400 µm in view of film-cutting-off ability. Still further, a ratio of the average width to an average length of the ramentum particles is preferably 1:1 to 1:3 in view of film-cutting-off ability. In this respect, "the average length and the average width are 40 to 400 µm" means that each of the average length and the average width of the ramentum particles is fallen within a range of 40 to 400 µm. The longest side of a plain surface of the particles is referred to as the length, and the longest height in vertical direction to the longest side is referred to as the width. Hardness of the particles is preferably not less than 4.5 Mohs hardness from the viewpoint of film-cutting-off ability. The ramentum particles include ramentum glass particles, ramentum mica, etc. From a viewpoint of hardness of the ramentum particles, the ramentum glass particles having Mohs hardness of not less than 6 are preferable because the ramentum mica has hardness of around 3. As the glass material for the ramentum particles, a conventional silicate glass such as soda lime glass and soda potassium glass, and also borosilicate glass, crystallized glass (glass ceramics), quartz glass, etc. can be used.

A content of the above ramentum particles to be incorporated is preferably 0.5 to 5% by weight in the total pressure sensitive adhesive layer (total adhesive composition calculated on the basis of a solid content) from viewpoints of adhesiveness and tackiness of adhesive layer and dispersibility of the particles.

The adhesive composition may be incorporated with an inorganic or an organic coloring agent within a range not suppressing adhesiveness, tackiness, film-cutting-off property, etc. whereby the adhesive layer is colored.

Thickness of the above pressure sensitive adhesive layer is preferably within a range of 5 to 35 µm, still preferably 10 to 25 µm from viewpoints of adhesive force to a paper surface, etc., retention power and film-cutting-off property. Formation of the pressure sensitive adhesive layer can be conducted by coating with the use of a bar coater, a roll coater, a gravure coater, a knife coater, a die coater, a comma coater, a lip coater, etc.

The pressure sensitive adhesive tape of the present invention can advantageously be used when contained in a handy-type transfer tool. The transfer tool includes one having such a construction as comprising a supply reel on which a transfer-type pressure sensitive adhesive tape is wound, a winding reel for winding a support body after transferring the pressure sensitive adhesive layer, a head for transferring the pressure sensitive adhesive layer to a receiving object under pressure, which head is located in an intermittent position of a tape transporting route between the supply reel and the winding reel, and a casing for containing them, the head having exposure out of the casing.

EXAMPLES

In the following, the present invention is explained in more details based upon Examples, but the present invention is not limited thereto by any means. In the following, a releasing means a weight part, and a coating amount, a number, a mixing ratio and the like are shown under conversion to a solid content.

Example 1

Preparation of Release Sheets

On one surface of a polyethylene film of 12 µm thick was coated a mixture of 93 parts of a silicone releasing agent (Shin-Etsu Chemical Co., Ltd. "KS-3601"), 5 parts of a cross-linking agent (Shin-Etsu Chemical Co., Ltd. "cat.PL-50T")

and 2 parts of silica powder (Nippon Silica Kogyo K.K. "Nip Seal E220A") by a gravure coater in a dried weight of 0.4 g/m², followed by drying by hot air to give a heavy releasing surface, and then on the other surface of the polyethylene film was coated a mixture of 95 parts of a silicone releasing agent (Shin-Etsu Chemical Co., Ltd. "KS-3650") and 5 parts of a cross-linking agent (Shin-Etsu Chemical Co., Ltd. "cat. PL-50T") by a gravure coater in a dry weight of 0.4 g/m², followed by drying by a hot air to give a light weight releasing surface, thereby a releasing sheet was obtained.

(Preparation of Adhesive Compositions)

At first, 98 parts of an acrylic type pressure sensitive adhesive agent (Soken Chemical & Engineering Co., Ltd. "SK-DYNE 801B", comprising an acrylic type copolymer and an adhesion-giving resin) and 2 parts of a cross-linking agent (Soken Chemical & Engineering Co., Ltd. "Kokazai L-45") were mixed to give an acrylic type adhesive composition for a base material. With 95 parts of the base adhesive composition was mixed 5 parts of ramendum glass particles (Mohs hardness: 6.5, thickness: 5 μm, average length: 150 μm, average width: 100 μm) to give a final adhesive composition.

The thickness, length and width of the ramentum particles were observed with a metal microscope. The average length and the average width were obtained on the basis of the average values of optionally selected 50 particles (hereinafter, the same applied).

(Preparation of Pressure Sensitive Adhesive Tape)

The above adhesive composition was coated on the light releasing surface of the above release sheet in a thickness of 20 μm (under drying) by a comma coater, followed by drying at 100° C. for 3 minutes, and the resultant was wound up in role shape so that the adhesive composition layer was brought into contact with the heavy releasing surface side and further slit into 6 mm width for storing the role in a transfer tool, thereby a pressure sensitive adhesive tape was obtained.

Example 2

A pressure sensitive adhesive tape was obtained by the same manner as in Example 1, excepting that 0.5 part of ramentum glass particles (Mohs hardness: 6.5, thickness: 5 μm, average length: 150 μm, average width: 100 μm) was mixed with 99.5 parts of the base adhesive composition of Example 1.

Example 3

A pressure sensitive adhesive tape was obtained by the same manner as in Example 1, excepting that 3 parts of ramentum glass particles (Mohs hardness: 6.5, thickness: 4 μm, average length: 300 μm, average width: 250 μm) was mixed with 97 parts of the base adhesive composition of Example 1.

Example 4

A pressure sensitive adhesive tape was obtained by the same manner as in Example 1, excepting that 3 parts of ramentum mica (Mohs hardness: 3, thickness: 2 μm, average length: δ 0 μm, average width: 35 μm) was mixed with 97 parts of the base adhesive composition of Example 1.

Example 5

A pressure sensitive adhesive tape was obtained by the same manner as in Example 1, excepting that 5 parts of ramentum (Mohs hardness: 6.5, thickness: 5 μm, average length: 15 μm, average width: 10 μm) was mixed with 95 parts of the base adhesive composition of Example 1.

Comparative Example 1

A pressure sensitive adhesive tape was obtained by the same manner as in Example 1, excepting that 3 parts of powdery fluorine resin particles (average particle size: 3.5 μm) was mixed with 97 parts of the base adhesive composition of Example 1.

Comparative Example 2

A pressure sensitive adhesive tape was obtained by the same manner as in Example 1, excepting that 3 parts of granular polyethylene particles (average particle size: 20 μm) was mixed with 97 parts of the base adhesive composition of Example 1.

Comparative Example 3

A pressure sensitive adhesive tape was obtained by the same manner as in Example 1, excepting that 3 parts of spherical silicone particles (average particle size: 12 μm) was mixed with 97 parts of the base adhesive composition of Example 1.

Comparative Example 4

A pressure sensitive adhesive tape was obtained by the same manner as in Example 1, excepting that 3 parts of needle like glass particles (Mohs hardness: 6.5, diameter: 10 μm, average length: 70 μm) was mixed with 97 parts of the base adhesive composition of Example 1

(Measurement of Physical Constants)

The above obtained each pressure sensitive adhesive tape was aged in a room of constant temperature of 20° C. and constant humidity of 65% RH for 7 days, and then an initial adhesive force and parting ability were measured. The result is shown in Table 1.

Each physical constant was measured under the following conditions:

(1) Initial Adhesive Force

A test piece was adhered to an SUS 304 steel plate according to JIS Z0237, and 180° parting strength after 20 minutes was measured. A tensile speed was set forth at 300 mm/min for the test. The initial adhesive forces (gf/25 mm) shown in Table 1 were each an average value on 10 test pieces. Evaluation of the initial adhesive force (gf/25 mm) was conducted after the following standard:

⊚: 1,000 gf/25 mm or more; extremely good
○: 800 gf/25 mm or more and less than 1,000 gf/25 mm; good
Δ: 650 gf/25 mm or more and less than 800 gf/25 mm; slightly inferior
X: less than 650 gf/25 mm; inferior (2) Releasing Ability Each pressure sensitive adhesive tape was mounted to a commercially available transfer tool. Using the transfer tool, the pressure sensitive adhesive layer was transferred to PPC paper under pressure of 800 gf, and the transfer tool was drawn up in vertical direction upon which a length of "string" of the adhesive agent was measured at the breaking point. A drawing speed was 400 mm/min. The values of releasing ability (mm) shown in Table 1 were an average value of 10 test pieces. Evaluation of the releasing ability was conducted according to the following standard:

⊚: not more than 5 mm; extremely good

○: more than 5 mm and not more than 10 mm; good
Δ: more than 10 mm and not more than 15 mm; slightly inferior
X: more than 15 mm; inferior

TABLE 1

|  | Initial adhesive force | | Film-cutting-off property | |
| --- | --- | --- | --- | --- |
|  | gf/25 mm | Evaluation | mm | Evaluation |
| Ex. 1 | 1,150 | ⊚ | 2.5 | ⊚ |
| Ex. 2 | 1,300 | ⊚ | 4.0 | ⊚ |
| Ex. 3 | 1,200 | ⊚ | 2.5 | ⊚ |
| Ex. 4 | 1,150 | ⊚ | 9.5 | ○ |
| Ex. 5 | 1,100 | ⊚ | 10.0 | ○ |
| Com. Ex. 1 | 1,050 | ⊚ | 30.0 | X |
| Com. Ex. 2 | 700 | Δ | 11.5 | Δ |
| Com. Ex. 3 | 950 | ○ | 22.5 | X |
| Com. Ex. 4 | 1,100 | ⊚ | 14.0 | Δ |

INDUSTRIAL APPLICABILITY

The transfer-type pressure sensitive adhesive tape of the present invention is excellent in adhesive force to a paper surface, etc. and running ability in transferring to a receiving body such as a paper surface under storing in a transfer tool, and the pressure sensitive adhesive layer can surely be cut-off at the desired position, and thus a transfer working can easily be conducted.

The invention claimed is:

1. A transfer pressure sensitive adhesive tape comprising a support and a releasable pressure sensitive adhesive layer provided on the support, wherein the releasable pressure sensitive adhesive layer is released from the support and transferred to a receiving object,
wherein the pressure sensitive adhesive layer contains only ramentum glass particles as particles, the ramentum glass particles being in the form of shavings with total flat surfaces wherein Mohs hardness of the ramentum glass particles is 4.5 or more, and
wherein the ramentum glass particles have a thickness of 4 to 5 μm, and an average length and width thereof are each 100 to 300 μm, and a ratio of the average width:the average length is 1:1.2 to 1:1.5, and
wherein the adhesive comprises an acryl copolymer and a cross-linking agent, and
the pressure sensitive adhesive layer contains 0.5 to 5% by weight of the ramentum glass particles.

* * * * *